United States Patent [19]

Grimm

[11] 4,435,535

[45] Mar. 6, 1984

[54] ADIPIC ACID AS A SCORCH INHIBITOR FOR CARBOXYLATED RUBBERS

[75] Inventor: Donald C. Grimm, Tallmadge, Ohio

[73] Assignee: The Goodyear Tire & Rubber Company, Akron, Ohio

[21] Appl. No.: 379,242

[22] Filed: May 17, 1982

[51] Int. Cl.³ .................................................. C08K 5/09
[52] U.S. Cl. .................................... 524/321; 524/432; 524/433
[58] Field of Search ............................... 524/321, 432

[56] References Cited

U.S. PATENT DOCUMENTS

| | | | |
|---|---|---|---|
| 3,000,851 | 9/1961 | Schweitzer | 524/321 |
| 3,175,991 | 3/1965 | Levine et al. | 524/432 |
| 3,205,185 | 9/1965 | Lessells et al. | 524/321 |
| 3,220,968 | 11/1965 | Dollhausen et al. | 524/321 |
| 3,408,320 | 10/1968 | Brucksch | 524/321 |
| 3,492,265 | 1/1970 | Hofley et al. | 524/432 |
| 3,671,295 | 6/1972 | Ravve et al. | 524/432 |
| 3,880,821 | 4/1975 | Feniak | 524/397 |
| 4,191,671 | 3/1980 | Kataoka et al. | 524/255 |

*Primary Examiner*—Joseph L. Schofer
*Assistant Examiner*—N. Sarofim
*Attorney, Agent, or Firm*—A. T. Rockhill

[57] ABSTRACT

Scorch (the premature crosslinking of an elastomer) is a problem that is often encountered in carboxylated rubbers in the presence of metal oxides which are used as crosslinking agents. Adipic acid can be used to greatly improve the scorch resistance of carboxylated rubbers. Adipic acid can be distributed throughout a carboxylated rubber before or after coagulation using any procedure that will result in a thorough mixing to form a rubber composition with improved scorch resistance.

6 Claims, No Drawings

ADIPIC ACID AS A SCORCH INHIBITOR FOR CARBOXYLATED RUBBERS

BACKGROUND OF THE INVENTION

Carboxylated rubbers (rubbers containing carboxyl groups in their polymer chain) are useful for many purposes. Carboxylic nitrile rubber (XNBR) is a terpolymer of butadiene, acrylonitrile, and methacrylic acid. This carboxyl modification of nitrile rubber (NBR) produces a material that has outstanding abrasion resistance. Metal oxide vulcanizates of carboxylic elastomers also have unusually high tensile strengths, superior ozone resistance, and elevated modulus values. Such carboxyl modification of a rubber typically involves the addition of about 0.75 percent to 15 percent by weight of an unsaturated carboxylic acid of the acrylic acid type to the monomer charge composition of the carboxylic rubber being synthesized.

These carboxylated elastomers can be vulcanized in a manner analogous to their uncarboxylated counterpart utilizing a sulfur curing agent. In addition to this, if a polyvalent radical and particularly divalent metals are available in the vulcanization recipe, the carboxyl groups in the polymer chain can take part in this cross-linking reaction. This cross-linking reaction is fast in the presence of divalent metals and scorch problems are often encountered. Even at room temperature, carboxylated rubbers will often cure in 48 hours or less in the presence of zinc oxide when uninhibited. Since scorch (the premature cross-linking of an elastomer) can render a rubber completely unworkable, it is necessary to control this cross-linking reaction between carboxyl groups on the polymer chain. This invention discloses the use of adipic acid as an agent to greatly improve the scorch resistance of carboxylated rubbers.

THE INVENTION

Adipic acid can be used as a scorch inhibitor in any carboxylated rubber. This invention discloses an improved scorch resistant carboxylated rubber composition comprising: a carboxylated rubber and adipic acid which is distributed throughout said carboxylated rubber composition as a scorch inhibitor. These carboxylated rubbers (elastomers) contain chain linkages derived from unsaturated carboxylic acids of the acrylic acid type. Some representative examples of unsaturated carboxylic acids of the acrylic acid type include acrylic acid, methacrylic acid, sorbic acid, β-acryloxypropanoic acid, ethacrylic acid, 2-ethyl-3-propyl acrylic acid, vinyl acrylic acid, cinnamic acid, maleic acid, fumaric acid, and the like. The rubbers for which adipic acid is useful as a scorch inhibitor generally contained from about 0.75 percent to 15 percent by weight chain linkages which are derived from unsaturated carboxylic acids.

These carboxylic rubbers can be synthesized using any conventional polymerization technique. Emulsion polymerization of carboxylated elastomers is generally preferred and is used almost exclusively in industrial production. This type of a synthesis generally utilizes a charge composition comprising water, monomers, an initiator, and an emulsifier (soap). Such polymerization can be run over a very wide temperature range from about 0° C. to as high as 100° C. Very good results have been obtained when polymerizations are run at a temperature from about 5° C. to 60° C.

The amount of carboxylic monomer (unsaturated carboxylic acid of the acrylic acid type) incorporated in a carboxylated rubber may be varied over a wide range. The monomer charge ratio between the carboxylic monomer and the comonomers employed in a polymerization may also be varied over a very wide range. A typical monomer charge composition for a carboxylated nitrile rubber is 67 percent butadiene, 26 percent acrylonitrile, and 7 percent methacrylic acid (percentages are by weight). Some other monomers that may be copolymerized with a carboxylic monomer to form elastomers for which adipic acid is useful as a scorch inhibitor include styrene; isoprene; vinylidene monomers having one or more terminal $CH_2\!=\!C\!<$ groups; vinyl aromatics such as α-methylstyrene, bromostyrene, chlorostyrene, fluorostyrene, vinylphenol, 3-hydroxy-4-methoxystyrene, vinylanisole, β-nitrostyrene, and the like; α-olefins such as ethylene; vinyl halides, such as vinylbromide, chloroethene (vinylchloride), vinylfluoride, vinyliodide, 1,2-dibromoethene, 1,1-dichloroethylene (vinylidene chloride), 1,2-dichloroethylene, and the like; vinyl esters such as vinyl acetate; α,β-olefinically unsaturated nitriles, such as methacrylonitrile; α,β-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; α,β-olefinically unsaturated N-alkylol amides having the general structural formula:

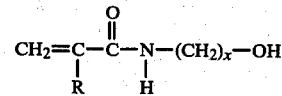

wherein R is a hydrogen atom or an alkyl group containing from 1 to 4 carbon atoms and x is an integer from 1 to 4 inclusive such as N-methylol acrylamide, N-ethylol acrylamide, N-propylol acrylamide, N-methylol methacrylamide, N-ethylol methacrylamide, and the like; vinyl pyridine; n-octyl methacrylate, dodecyl methacrylate, methyl ethacrylate, and ethyl ethacrylate; haloalkyl acrylates such as chloropropyl acrylate; methacrylates; hydroxyethylacrylate; and polyfunctional compounds such as ethylene glycol dimethacrylate, diethylene glycol diacrylate, divinylbenzene, alkenyl pentaerythritol, methylene-bis-acrylamide, and the like.

In the polymerization of unsaturated carboxylic acids, of the acrylic acid type with one or more of the above-mentioned monomers, there can be competing or side reactions which take place. Therefore, the choice of reactants, process conditions, order of addition of reactants and the like, should be selected in order to produce a useful rubber containing carboxyl groups. The monomers employed and monomer ratios used in the charge composition for the polymerization should be selected in a manner that will produce a carboxylated elastomer. It should be noted that many combinations of the above-mentioned monomers will result in the polymerization of a nonelastomeric polymer. The carboxyl modified polymers which are generally preferred include carboxylated nitrile rubber, which is a copolymer of butadiene, acrylonitrile, methacrylic acid; terpolymers of methacrylic acid, styrene, and butadiene; copolymers of methacrylic acid and butadiene; copolymers of methacrylic acid and isoprene; terpolymers of acrylic acid, acrylonitrile, and butadiene; and terpolymers of methacrylic acid, vinylidene chloride, and butadiene.

The emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid, and the like; amine soaps of fatty acids such as those formed from ammonia, mono-and di-alkyl amines, substituted hydrazines, guanidine, and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester, or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

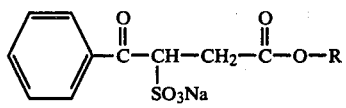

wherein R is an alkyl group having from 1 to 20 carbon atoms; alkarylsulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonated derivatives of rosin and rosin oil; and lignin sulfonates, and the like.

Rosin acid soap has been used with good success at a concentration of about 5 percent by weight in the initial charge composition used in the synthesis of carboxylated elastomers. Of rosin acids, about 90 percent are isometric with abietic acid and the other 10 percent is a mixture of dehydro abietic acid and dihydro abietic acid.

The polymerization of these carboxylated rubbers may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, diethyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like. Cumene hydroperoxide can be used as an initiator to obtain very good results in the polymerization of carboxylated nitrile.

The emulsion polymerization system used in the synthesis of carboxylated rubbers can be treated at the desired degree of conversion with shortstopping agents, such as hydroquinone. Typical shortstopping agents will not interfere with the action of the adipic acid as a scorch inhibitor. Typical stabilizing agents and standard antioxidants can also be added to the emulsion of a carboxylated rubber without interfering with the action of the adipic acid.

After the emulsion polymerization has been completed, many conventional coagulating techniques can be employed. Normally such latexes are coagulated with reagents which insure the preservation of the carboxyl groups of the elastomers as acidic moieties. Coagulation with acid or blends of salts with acids is usually very satisfactory. For example, sulfuric acid, hydrochloric acid, blends of sodium chloride with sulfuric acid, and blends of hydrochloric acids with methanol are very effective as coagulating agents for carboxylated rubber emulsions. Calcium chloride solutions which are free of calcium hydroxide have also been used as coagulants with great success.

After coagulation washing may be employed to remove excess soap and/or electrolyte from the carboxylated rubber. Sometimes washing is also useful in adjusting the pH of the carboxylated elastomer that has been synthesized. After washing, if it is desired, the elastomer can be dewatered. If it is desirable to do so, the carboxylated rubber can also be dried and baled after dewatering using conventional techniques.

Normally, the metal oxide or hydroxide of polyvalent metal such as Zn, Mg, Ca, Be, Al, Ni, Cr, Mn, Sn, etc., is mixed into a carboxylated rubber after it has been dried and baled. Usually from about 0.5 to 10 parts of the metal oxide per hundred parts rubber (phr) is employed as a crosslinkage agent. Excellent results are obtained using about 5 phr of zinc oxide. This process of mixing the zinc oxide into the rubber is usually carried out by utilizing a Banbury mixer; however, any other procedure that will adequately mix the zinc oxide with the carboxylated rubber can also be employed. Normally, it is advantageous to minimize the time period between the point when the zinc oxide is added and the time at which the carboxylated rubber will be vulcanized (crosslinked). By minimizing this time period the amount of time in which spontaneous crosslinking between carboxyl groups can occur is minimized. Since unwanted crosslinking (scorch) often occurs in processing equipment (sometimes due to heat build-up) before it is desired the time at which the metal oxide is added is not a total solution to the problem.

By distributing (mixing) adipic acid throughout a carboxylated rubber a scorch resistant carboxylic rubber composition is produced with the problem of premature crosslinking (scorch) being greatly reduced. Adipic acid can be mixed into dried rubber using any procedure that will result in a thorough mixing. Good results have been obtained by mixing adipic acid into dried rubber with a Banbury mixer.

Adipic acid may also be mixed into the emulsion of a carboxylated rubber (prior to coagulation). By adding adipic acid directly to the emulsion used in the polymerization of the rubber, excellent mixing will result. This procedure will provide excellent scorch safety, as is obtained when adipic acid is mixed into dried rubber utilizing the Banbury mixer. However, since adipic acid is slightly soluble in water excessive washing after coagulation should be avoided.

Adipic acid will provide excellent scorch safety for a carboxylated rubber at a concentration of about 3 parts per hundred parts of rubber (phr) by weight. It will usually be desirable to use lesser amounts of adipic acid since in lower concentrations it can also provide adequate scorch safety. It is contemplated that for most carboxylated rubbers a concentration of adipic acid from about 0.1 to about 1.5 phr would provide very satisfactory scorch resistance for most applications. The optimum amount of adipic acid needed will vary with the degree of carboxylation in the rubber being treated and with the processing conditions that will ultimately be employed in manufacturing the rubber into useful products.

This invention is illustrated by the following representative examples which are merely for the purpose of illustration and are not to be regarded as limiting the scope of the invention or the manner in which it may be practiced. Unless specifically indicated otherwise, parts and percentages are given by weight.

EXAMPLES 1 THROUGH 8

In order to demonstrate the superiority of adipic acid as a scorch inhibitors when compared to other carboxylic acids and anhydrides a direct comparison between the scorch safety provided by it and numerous other carboxylic acids and anhydrides was experimentally made.

The structural formulas of the anhydrides and carboxylic acids used in these examples is shown below:

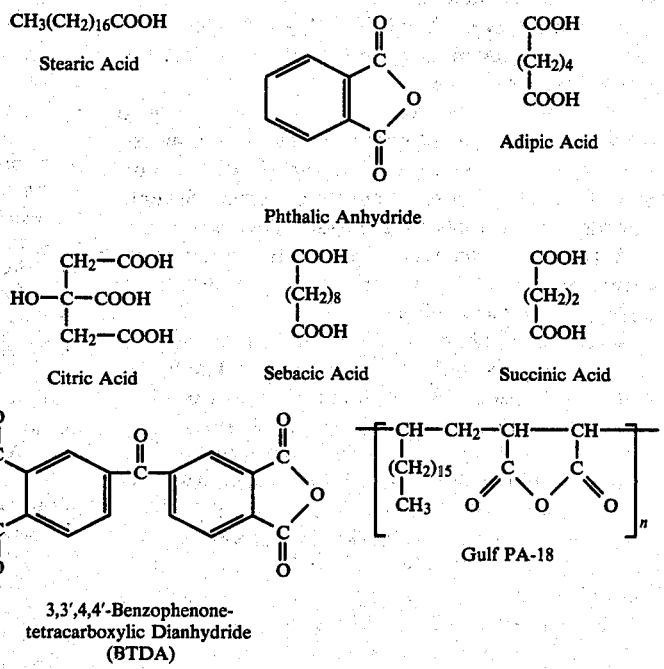

Gulf PA-18 is a polymerized anhydride with a molecular weight of approximately 50,000.

A carboxylated nitrile rubber was used for these examples. The charge composition used in the synthesis of this carboxylated nitrile rubber was 200 parts deionized water, 0.42 parts potassium hydroxide, 2.46 parts dodecylbenzene sulfonic acid, 0.3 parts sodium acid phosphate, 0.1 parts tetrasodium ethylene diamine tetraacetate, 7 parts methacrylic acid, 0.45 parts tertiary dodecylmercaptan, 27 parts acrylonitrile, 0.03 parts cumene hydroperoxide, 66 parts butadiene, 0.02 parts sodium formaldehyde sulfoxylate, and 0.001 parts chelated ferrous sulfate. In the preparation of this charge composition the potassium hydroxide and dodecyl benzene sulfonic acid were premixed with 196 parts of deionized water and allowed to react for 15 minutes before adding the other components of the charge composition. The sodium formaldehyde sulfoxylate and chelated ferrous sulfate activators were premixed in a separate vessel in 4 parts of deionized water before they were added to the main reaction vessel and mixed with the other components in the charge composition.

This polymerization was run in a 20 gallon reactor with agitation by two 6 inch Brumagim mixers at 300 rpm's (revolutions per minute). This polymerization was run at a temperature of 21° C. (70° F.). This temperature was maintained for 10 hours at which time the solid content of the emulsion had reached 27.7 percent.

At this point, the reaction had reached approximately 80 percent conversion and 0.1 parts of sodium nitrite was added as a short stop. The emulsion was then degassed to remove unpolymerized butadiene monomer that was present. This degassing was accomplished by applying 20 inches of vacuum to the emulsion for 10 hours.

Approximately 136 pounds of latex was synthesized utilizing this polymerization recipe. Seventy-three pounds of this latex was added to a solution of 40 pounds of sodium chloride and 710 grams of concentrated sulfuric acid in 600 pounds of water which was at a temperature of 60° C. (140° F.). As this solution was vigorously agitated coagulation of the carboxylated nitrile rubber occurred.

The rubber crumb was dipped out of this aqueous solution and dewatered with a dewatering screw down to about 10 percent water. The rubber was then oven dried to under 0.5 percent moisture content. Seventeen pounds of dried rubber was produced by this process.

A Banbury mixer was employed to add 50 parts of carbon black and 3 parts of various scorch inhibiting agent per 100 parts rubber (phr).

A Midget Banbury Mixer manufactured by Farrel Corporation was used for these examples. The Banbury was run at a speed of 84 rpm's and the rubber was mixed (by itself) for an initial breakdown period of one minute. After this initial breakdown period the carbon black and scorch inhibiting agent being tested were added and mixed for a period of 3 minutes. This technique made a very good mixture of the rubber, carbon black and scorch inhibiting agent being tested. Two parts tetramethyl thiuram disulfide, 1 part n-oxydiethylene benzothiazole-2-sulfinamide, 5 parts zonc oxide, and 0.3 parts sulfur per 100 parts rubber (phr) were mill mixed using a rolling bank into the rubber for one minute followed by 10 additional passes through the mill mixer.

These samples containing the different scorch inhibiting agents were then tested to determine their Mooney Scorch values. Mooney Scorch values for rubber samples containing each of the eight aforementioned scorch inhibiting agents to a 5 and 10 point rise in Mooney Scorch were determined at an operating temperature of 121° C. (250° F.) using ASTM Method D1077. The values that were determined for a 5 and 10 point rise in Mooney Scorch (designated as T-5 and T-10, respectively) are given in Table I.

TABLE I

| Example | Agent | T-5 (min) | T-10 (min.) |
|---|---|---|---|
| 1 | Adipic Acid | 31.8 | 35.1 |
| 2 | Stearic Acid | 8.3 | 9.8 |
| 3 | Phthalic Anhydride | 2.3 | 2.9 |

TABLE I-continued

| Example | Agent | T-5 (min) | T-10 (min.) |
|---|---|---|---|
| 4 | Citric Acid | 9.1 | 14.0 |
| 5 | Sebacic Acid | 6.2 | 7.9 |
| 6 | Succinic Anhydride | .6 | .8 |
| 7 | BTDA | 7.8 | 11.6 |
| 8 | PA-18 | 4.3 | 5.4 |

T-5 values of 15 minutes or greater are generally considered necessary for adequate scorch safety. As can be determined by examining Table I, adipic acid is the only agent in the example that provides greater than 15 minutes of Mooney Scorch protection. When adipic acid was used as a scorch inhibiting agent it took over three times as long to reach a five point rise in Mooney Scorch than it did when any other agent was used as a scorch inhibitor. The time to a 10 point rise in Mooney Scorch when adipic acid was employed was over 2.5 times as long as when any other scorch inhibiting agent tested was employed. It is readily apparent that adipic acid is vastly superior to any other carboxylic acid or anhydride as a scorch inhibitor.

While certain representative embodiments and details have been shown for the purpose of illustrating the invention, it will be apparent to those skilled in this art that various changes and modifications may be made therein without departing from the scope of the invention.

What is claimed is:

1. An improved scorch resistant dried carboxylated nitrile rubber composition comprising: a dried carboxylated nitrile rubber and adipic acid which is distributed throughout said dried carboxylated nitrile rubber as a scorch inhibitor.

2. An improved scorch resistant dried carboxylated nitrile rubber composition comprising: a dried carboxylated nitrile rubber, a metal oxide, and adipic acid which is distributed throughout said dried carboxylated nitrile rubber as a scorch inhibitor.

3. An improved scorch resistant dried carboxylated nitrile rubber composition as specified in claim 2, wherein said metal oxide is a member selected from the group consisting of zinc oxide, magnesium oxide, copper oxide, calcium oxide, and nickel oxide.

4. An improved scorch resistant dried carboxylated nitrile rubber composition as specified in claim 3, wherein said metal oxide is zinc oxide.

5. An improved scorch resistant dried carboxylated nitrile rubber composition as specified in claims 1 or 2, wherein said adipic acid is at a concentration from about 0.1 phr to about 1.5 phr.

6. A process for improving the scorch resistance of a dried carboxylated nitrile rubber comprising, distributing throughout said dried carboxylated nitrile rubber adipic acid as a scorch inhibitor.

* * * * *

UNITED STATES PATENT OFFICE
CERTIFICATE OF CORRECTION

PATENT NO. : 4,435,535
DATED : Mar. 6, 1984
INVENTOR(S) : Donald C. Grimm

It is certified that error appears in the above-identified patent and that said Letters Patent are hereby corrected as shown below:

Column 4, line 11, delete "diethyl" and substitute therefor --dicetyl--.

Column 7, line 25, delete "agent" and substitute therefor --agents--.

Signed and Sealed this

Thirtieth Day of October 1984

[SEAL]

Attest:

GERALD J. MOSSINGHOFF

Attesting Officer

Commissioner of Patents and Trademarks